United States Patent [19]

Cousino

[11] 3,829,033

[45] Aug. 13, 1974

[54] TAPE CARTRIDGE AND PLAYER APPARATUS

[75] Inventor: Bernard A. Cousino, Toledo, Ohio

[73] Assignee: Faraday, Inc., Ann Arbor, Mich.

[22] Filed: Oct. 20, 1971

[21] Appl. No.: 190,884

[52] U.S. Cl. .................... 242/55.19 A, 179/100.2 Z
[51] Int. Cl. ...................... B65h 17/48, G11b 15/66
[58] Field of Search ...... 242/55.19 A, 198; 274/4 B, 274/4 E; 179/100.2 Z

[56] References Cited

UNITED STATES PATENTS

| | | | |
|---|---|---|---|
| 2,922,642 | 1/1960 | Cousino | 242/55.19 A |
| 3,311,316 | 3/1967 | Williams | 242/55.19 A |
| 3,403,868 | 10/1968 | Lear | 242/55.19 A |
| 3,420,461 | 1/1969 | Cousino | 242/55.19 A |
| 3,504,135 | 3/1970 | Hammond | 274/4 B |
| 3,726,457 | 4/1973 | Staar | 242/55.19 A X |

FOREIGN PATENTS OR APPLICATIONS

| | | |
|---|---|---|
| 763,520 | 4/1971 | Belgium |

*Primary Examiner*—Billy S. Taylor
*Attorney, Agent, or Firm*—Molinare, Allegretti, Newitt & Witcoff

[57] ABSTRACT

The disclosure describes apparatus for guiding and releasably locking an endless tape loop cartridge in relationship to the head of a corresponding player unit. The apparatus includes ramp surfaces placed on either side of the cartridge between the top and base thereof that are each terminated in a locking surface. Corresponding ramp and locking surfaces in the player unit cooperate with the cartridge in order to releasably lock it into playing position. The base of the cartridge is preferably cut away to expose tape guide means positioned adjacent the front edge of the cartridge for guiding a loop of tape across the front of the cartridge. In addition, the pressure pad of the cartridge is arranged so that it normally makes contact with the edge of a rotatable disc that supports the tape in order to perform a braking function.

4 Claims, 28 Drawing Figures

INVENTOR.
BERNARD A. COUSINO
BY Molinare, Allegretti
Newitt & Witcoff
ATTORNEYS

INVENTOR.
BERNARD A. COUSINO
BY Molinare, Allegretti
Newitt & Witcoff
ATTORNEYS

INVENTOR.
BERNARD A. COUSINO
BY Molinare, Allegretti, Newitt & Witcoff
ATTORNEYS INVENTOR.
BERNARD A. COUSINO
BY Molinare, Allegretti, Newitt & Witcoff
ATTORNEYS INVENTOR.
BERNARD A. COUSINO
BY Molinare, Allegretti, Newitt & Witcoff
ATTORNEYS

TAPE CARTRIDGE AND PLAYER APPARATUS

BACKGROUND OF THE INVENTION

This invention relates to magnetic tape cartridges, and more particularly relates to magnetic tape cartridges employing an endless loop of tape.

Tape cartridges employing an endless loop of magnetic tape are well-known in the art and have been described in the past. For example, one such tape cartridge is described in U.S. Pat. No. 3,420,461 issued Jan. 7, 1969 in the name of Ralph E. Cousino. Although this tape cartridge is a significant improvement over analogous prior art cartridges, it has exhibited certain deficiencies that have limited its overall usefulness. For example, as shown in FIGS. 6 and 7 of that patent, the tape cartridge is locked into position by maneuvering upstanding "dogs" into corresponding depressed seats that are placed in the base of the cartridge. As a result of this arrangement, the insertion and removal of the cartridge into the player mechanism is not achieved with as high a degree of smoothness and accuracy as would be desirable.

Accordingly, one object of the present invention is to provide an improved means of guiding and releasably locking an endless magnetic tape cartridge in relationship to the head of a corresponding player unit.

Another object of the present invention is to provide such apparatus in which the guiding and locking mechanism is located on the sides of the cartridge.

Various means of braking the tape-supporting disc of an endless magnetic tape cartridge have been proposed in the past. For example, one such braking mechanism is described in my prior U.S. Pat. No. 2,922,642 issued Jan. 26, 1960, as well as in the above-identified U.S. Pat. No. 3,420,461. Although these braking mechanisms are effective, they require a number of mechanical parts that are relatively expensive and complicated to manufacture and assemble.

As a result, it is a further object of this invention to provide an improved apparatus for braking the disc of an endless magnetic tape cartridge.

It is yet another object of this invention to provide such a brake mechanism in which the pressure pad of the tape cartridge is arranged to normally bear against the periphery of the tape disc, thereby providing a braking force against the disc.

Tape cartridges of the type described in the above-identified patents normally employ removable tape guide members positioned adjacent the front edge of the cartridge for guiding a loop of magnetic tape from a tape disc assembly across the front of the cartridge. Although such removable guide members operate satisfactorily once the tape loop is wound on the tape on the tape disc, they are a source of difficulty during the tape loading and/or winding process.

As a result, it is another object of the present invention to provide an improved tape guide arrangement whereby tape may be wound on the tape disc by automatic winding machines.

It is still another object of the present invention to provide a tape guide arrangement of the foregoing type in which the tape guide members are permanently affixed to a sidewall of the cartridge, and whereby a portion of the cartridge base is cut away to expose the tape guide members in order to facilitate the loading and/or winding of the tape by automatic means.

SUMMARY OF THE INVENTION

In order to achieve the foregoing objects and features, the present invention is preferably employed in a tape cartridge for an endless sound reproducing tape comprising a base defining a first side edge, a second side edge and a front edge. The cartridge also comprises a tape disc assembly mounted on the base for rotation, the tape disc assembly defining a tape storage area for receiving a coil of sound reproducing tape. A top is provided for covering the tape storage area, and tape guide means are positioned adjacent the front edge of the cartridge for guiding a loop of the tape from the tape disc assembly across the front of the cartridge. At least one head opening is defined in the front of the cartridge and is adapted to receive a head of a sound-reproducing apparatus. In addition, a pressure pad is located in the cartridge adjacent the head opening so that the tape is biased against the head.

When used in connection with the foregoing apparatus, a principal feature of the invention comprises apparatus for guiding and releasably locking the cartridge in relationship to the head. This apparatus comprises locking surfaces that extend from the top toward the base of the cartridge to respective termination points. Sliding surfaces that extend from the termination points toward the front edge of the cartridge are also provided.

By using the foregoing apparatus in combination with corresponding portions of a player unit, the head opening may be accurately aligned with the head or heads by the locking surfaces with a degree of accuracy heretofore unattainable. In addition, the ramp and sliding surfaces provide a means of smoothly and efficiently moving the cartridge to and from its locked position.

According to another feature of the invention, the tape guide means positioned adjacent the front end of the cartridge are permanently attached to the side walls of the cartridge, and means for terminating the base to expose the tape guide means are provided so that automatic winding apparatus may be employed for winding the tape on the tape disc.

According to another feature of the invention, the tape disc has a roughened portion on its periphery, and the pressure pad normally bears against the roughened portion in order to provide a braking force when the cartridge is not in use. When the cartridge is inserted into a player, the head thereof compresses the pressure pad so that it is no longer in contact with the disc. As a result, the disc is free to be moved by tape transport apparatus in the player unit.

By using the foregoing braking apparatus, no additional parts are required, thereby increasing the reliability and reducing the assembly cost of the resulting apparatus to a degree hertofore unattainable.

DESCRIPTION OF THE DRAWINGS

These and other objects, advantages and features of the present invention will hereinafter appear for purposes of illustration, but not of limitation, in connection with the accompanying drawings, wherein like numbers refer to like parts throughout, and wherein.

DESCRIPTION OF THE PREFERRED EMBODIMENT

Figure 1:
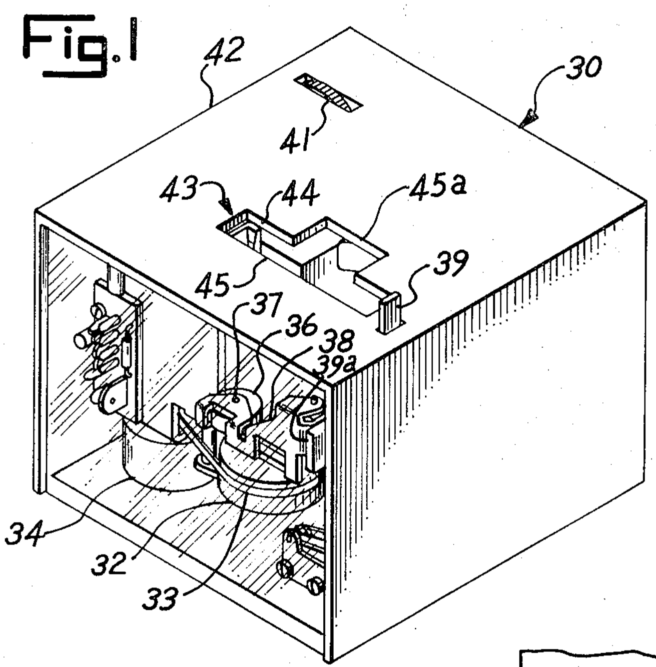
FIG. 1 is a perspective view of an exemplary tape transport and player unit for use in connection with the present invention.
Figure 3:
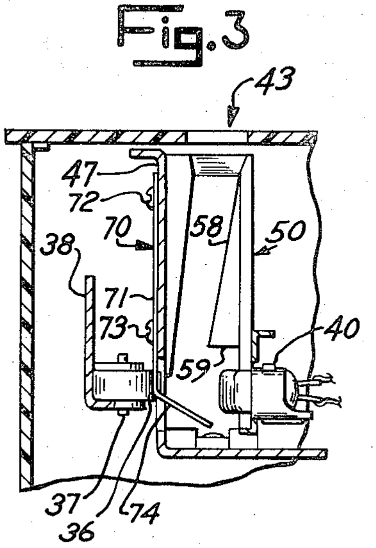
FIG. 3 is a fragmentary, partially cross-sectional view taken along line 3—3 in FIG. 2.
Figure 2:
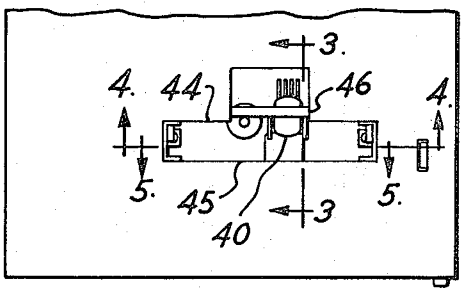
FIG. 2 is a fragmentary, top plan view of a portion of the player unit shown in FIG. 1.

FIGS. 1–5 illustrate an exemplary tape cartridge player unit 30 that may be used in connection with the present invention. The player unit includes a fly wheel 32 that is driven through a belt 33 by an electric motor 34 which is energized by a source of power not shown. The fly wheel is attached to a conventional capstan 35 that comates with a pressure roller 36 in order to drive magnetic tape. Pressure roller 36 rotates about an axle 37 that is attached to a movable bracket 38 which may be moved into and out of engagement with the capstan by push rods 39 and **39*a***.

Figures 4, 5:
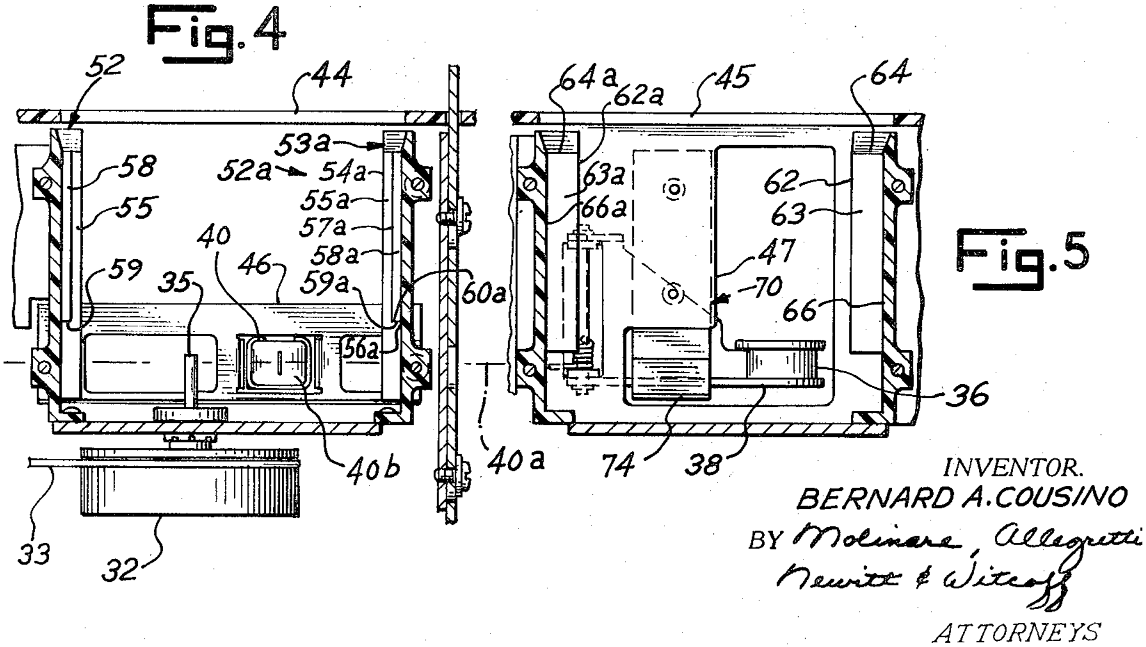
FIG. 4 is a fragmentary, partially cross-sectional view taken along line 4—4 in FIG. 2.
FIG. 5 is a fragmentary, partially cross-sectional view taken along line 5—5 in FIG. 2.

The capstan and pressure roller cooperate to move a loop of magnetic tape across the player surface **40*b* of a tape head 40 that is arranged along a center line 40*a* (FIG. 4). In a well known manner, the tape head generates electrical signals from the tape that are processed by an amplifier and speaker system (not shown) in order to produce sound. The amplifier and speaker are controlled by a switch 41 (FIG. 1). The entire player unit 30 is held within a plastic casement 42 having a cartridge opening 43 located in the top surface thereof. The cartridge opening comprises a rear edge 44, a front edge 45, and a finger opening 45*a* which facilitates the removal of the tape cartridge from opening 43**.

According to a preferred practice of the invention, the tape cartridge player unit comprises tape cartridge guide apparatus 50 that is supported on frame members 46 and 47 for the purpose of guiding and locking a tape cartridge in the player unit so that a loop of tape is moved over head 40 in a precisely determined manner.

Figure 28:
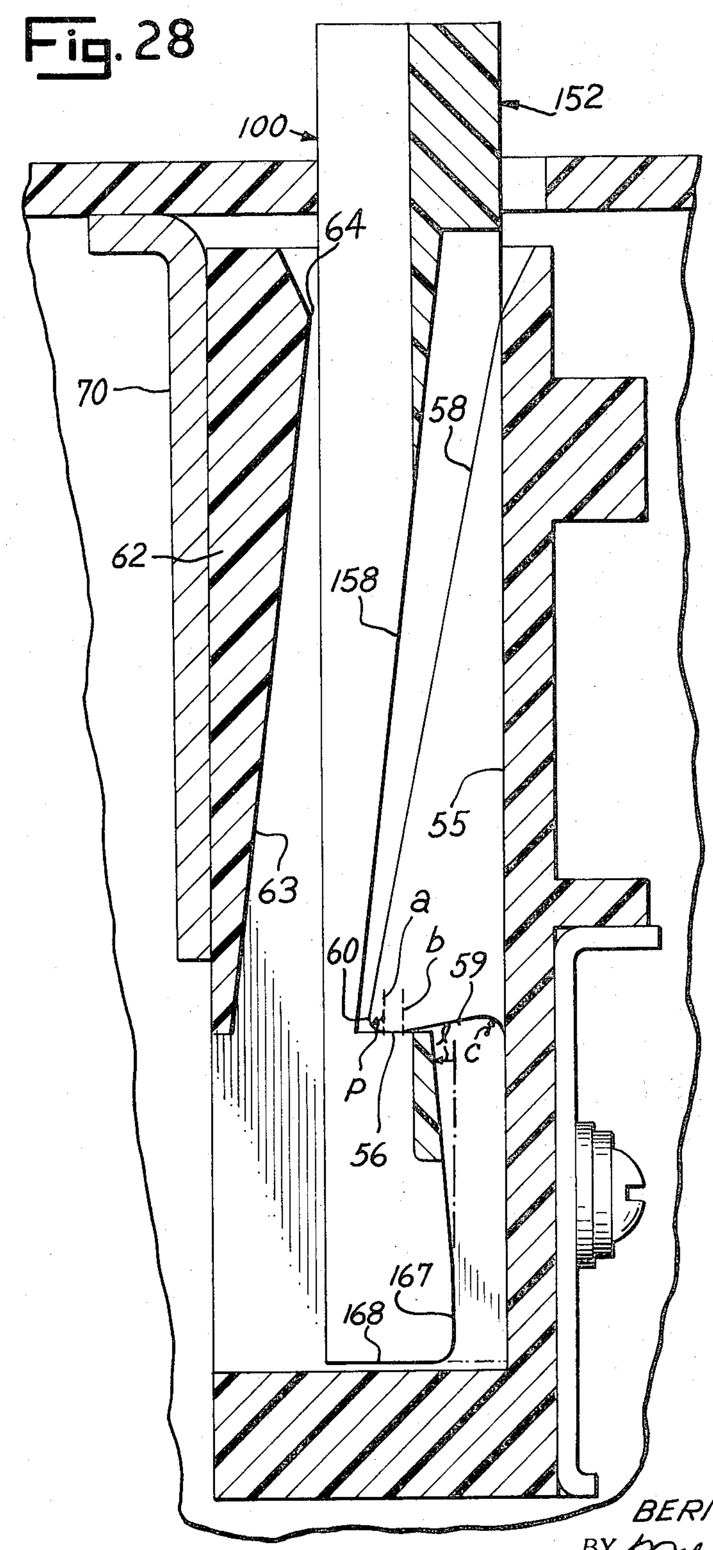
FIG. 28 is an enlarged, fragmentary, cross-sectional view showing the cartridge in its fully-inserted and locked position.

Referring to FIGS. 3–5 and 18, guide apparatus 50 comprises a left-hand guide member 52 that is an integrally molded piece of plastic. Guide member 52 comprises a support member 53 (FIG. 18) that defines an inner surface 54 and an upper supporting surface 55. Member 52 also comprises a lower ramp member 57 that defines a lower ramp surface 58 which makes an angle of about 11°, with supporting surface 55 and a locating surface 59 which makes an angle of about 80° with supporting surface 55. Referring to FIG. 28, locating surface 59 defines a locking surface 56 that is located between lines a and b and is perpendicular to surface 55. Applicant has found that best results are achieved when the distance between lines a and b is about 0.039 inch. Surface 59 is further defined by two curved surfaces having a radius c of 0.04 inch and a radius d of 0.02 inch. This configuration of surface 59 is an important feature, since it provides a structure for precisely and smoothly locking the cartridge in place. Ramp surface 58 and locating surface 59 are joined at a junction 60. Guide member 52 also comprises an upper ramp member 62 that defines an upper ramp surface 63 which is parallel to ramp surface 58, a restraining edge 64 adjacent opening 43 that is parallel to surface 55, and a side surface 66 that is perpendicular to surface 55.

Guide apparatus 50 also comprises a right-hand guide member **52*a* in which various parts correspond to, are parallel to and directly opposed to the like-numbered parts of guide member 52. More specifically, referring to FIGS. 5 and 5, guide member 52*a* comprises a supporting member 53*a* that defines an inner surface 54*a* and an upper supporting surface 55*a* parallel to surface 55. Guide member 52***a* also comprises a lower ramp member 57*a* that defines a lower ramp surface 58*a* parallel to surface 58 and a locating surface 59*a* that is parallel to locating surface 59. Surfaces 58*a* and 59*a* are joined by a junction 60*a*. A locking surface 56a is located parallel to locking surface 56. Guide member 52*a* also comprises an upper ramp member 62*a* that defines an upper ramp surface 63*a* that is parallel to surface 63, a restraining edge 64*a* that is colinear with restraining edge 64, and a side surface 66*a* that is parallel to surface 66.

As shown in FIGS. 3, 5, and 12–17, tape cartridge guide apparatus 50 also comprises a biasing spring 70 made of copper or other suitable material, having a base portion 71 affixed to frame member 47 with screws 72, 73. Spring 70 also comprises a resilient lip portion 74 that extends into the path of a cartridge as it is inserted in the guide apparatus. This lip portion normally makes an angle of about 33° with surface 55 when a cartridge is not inserted in the guide apparatus.

FIGS. 6–10 and 19–27 illustrate a preferred form of an endless loop tape cartridge 100 made in accordance with the present invention. As shown in the drawings, the cartridge basically comprises a molded plastic base assembly 102, left-hand and right-hand cartridge guide members 152 and 152*a*, respectively, a tape disc assembly 180, a brake pressure-pad assembly 200, and a top assembly 210.

Figures 19, 20, 21, 22, 23, 24, 25, 26, 27:
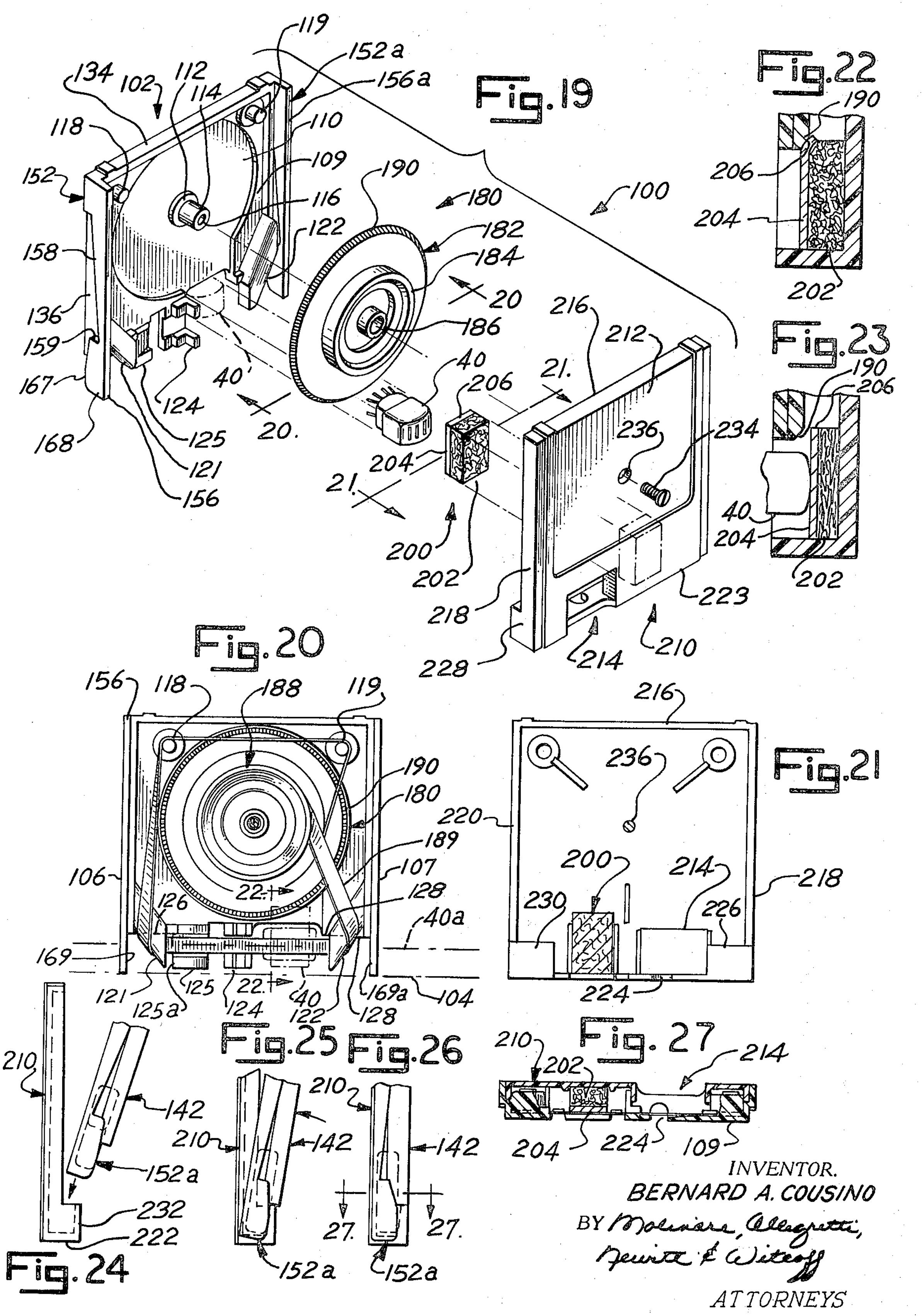
FIG. 19 is an exploded view of the cartridge shown in FIG. 6.
FIG. 20 is a top plan view of the cartridge shown in FIG. 6 with the top thereof removed.
FIG. 21 is a bottom plan view of the inside of the top of the cartridge shown in FIG. 19.
FIG. 22 is an enlarged, fragmentary, cross-sectional view taken along line 22—22 in FIG. 20, showing the pressure pad and tape disc periphery in an engaged position.
FIG. 23 is an enlarged, fragmentary, cross-sectional view showing the head of a player apparatus biasing the pressure pad away from the periphery of the tape disc.
FIGS. 24–26 are fragmentary, side elevational views illustrating the manner in which the base and top portions of the cartridge shown in FIG. 19 are assembled together.
FIG. 27 is a cross-sectional view taken along line 27—27 in FIG. 8.

More specifically, base assembly 102 defines a front edge 104 (FIG. 20), a left-side edge 106, and a right-side edge 107. The base assembly comprises a bottom panel 109 that defines a depressed circular area 110 adapted to receive a portion of tape disc assembly 180. Bottom panel 109 supports a bearing surface 112 and an axle 114, which in turn, defnes a hollow threaded cylinder 116. Bottom panel 109 also supports upstanding rear cylindrical tape guide posts 118 and 119. Base assembly 102 further comprises horizontal fron tape guide members 121 and 122 that guide the tape across the front of the cartridge. The tape is also guided between a fork tape guide member 124 and over a tape supporting member 125 that is terminated by a left-hand edge 125*a* (FIG. 20). Bottom panel 109 is terminated at front edge portion 126 in order to expose the under side of tape guide member 121 so that is is accessible to an automatic threading machine. This is an important feature of the cartridge, since the ability to utilize an automatic threading and/or loading machine drastically reduces the cost of producing the completed cartridge. Likewise, bottom panel 109 is terminated at front edge portion 128 in order to expose the lower side of tape guide member 122 so that it may accommodate automatic threading and/or loading apparatus.

Figures 6, 7, 8, 9, 10, 11, 12, 13, 14:
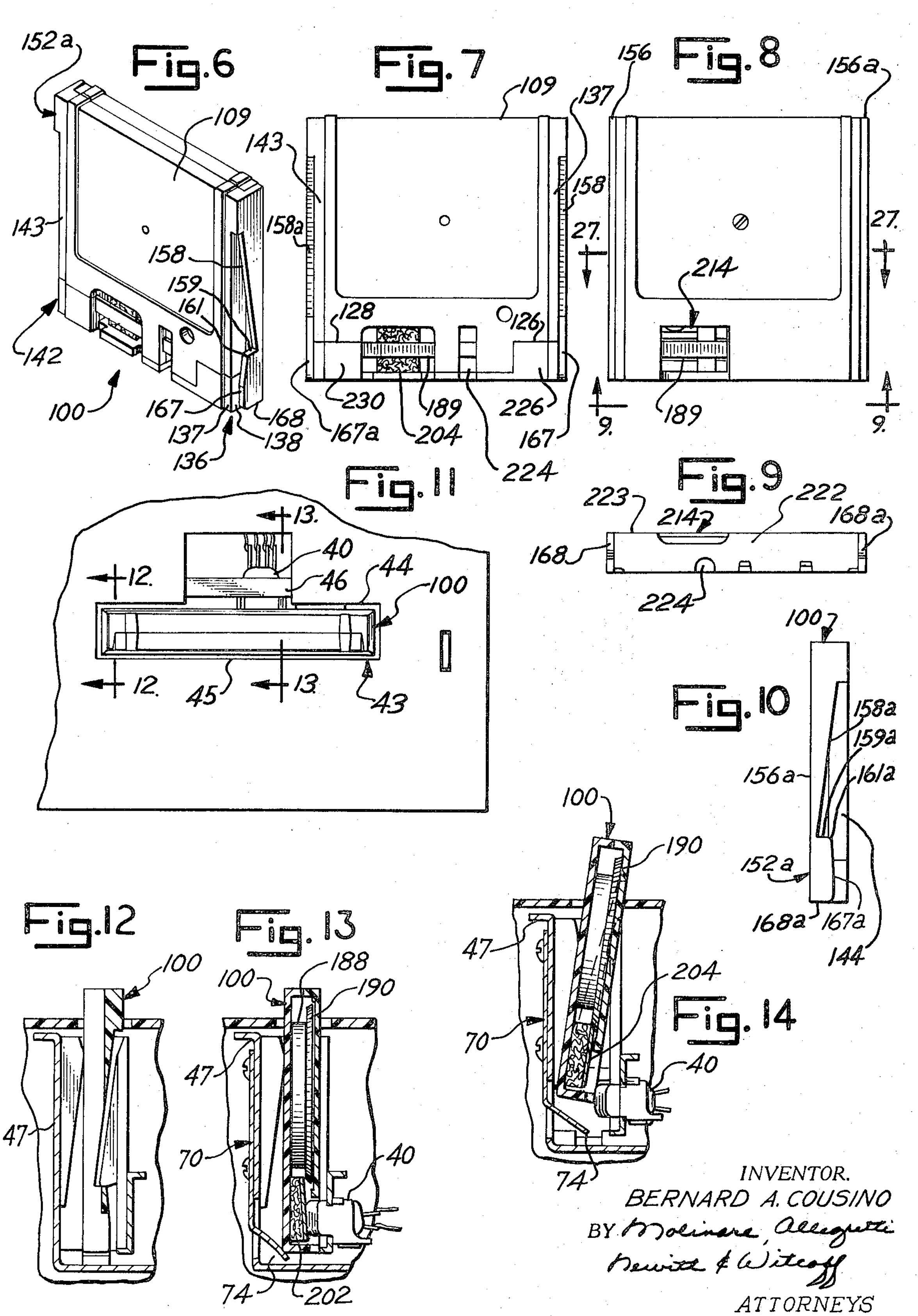
FIG. 6 is a perspective view of an exemplary tape cartridge made in accordance with the present invention.
FIG. 7 is a bottom plan view of the base portion of the cartridge shown in FIG. 6.
FIG. 8 is a top plan view of the cartridge shown in FIG. 6.
FIG. 9 is a front elevational view taken along 9—9 of FIG. 8.
FIG. 10 is a side elevational view of the cartridge shown in FIG. 8, in which the cartridge is turned to a vertical position.
FIG. 11 is an enlarged, top plan view of the player unit shown in FIG. 2 with the tape cartridge of FIG. 6 inserted therein.
FIG. 12 is a fragmentary, cross-sectional view taken along line 12—12 in FIG. 11.
FIG. 13 is a fragmentary, cross-sectional view taken along line 13—13 in FIG. 11.
FIG. 14 is a fragmentary, cross-sectional view taken along line 13—13 in FIG. 11, with the cartridge only partially inserted in the player unit.

Base assembly 102 also comprises a rear wall 134 (FIG. 19), a left side wall 136 that defines a supporting edge 137 and an outer surface 138 and a right sidewall 142 that defines a supporting edge 143 (FIG. 6), and an outer surface 144 (FIG. 10). As shown in FIG. 20, tape guide member 121 is integrally molded with sidewall 136, and tape guide member 122 is integrally molded with sidewall 142.

Referring to FIGS. 6, 19 and 20, a left-hand cartridge guide member 152 is integrally molded with left sidewall 136, guide member 152 defines an upper surface 156, a ramp surface 158, a locking surface 159 that ends in a terminating point 161, a sliding surface 167, a terminal surface 168, and an inside surface 169. As shown in FIG. 28, the rear portion of surface 167 makes an angle of about 5° with surface 55.

A right-hand cartridge guide member 152*a*, in which various parts are parallel to and directly opposite the like-numbered parts of left-hand guide member 152, is integrally molded with right-hand sidewall 142. Referring to FIGS. 10 and 19, guide member 152*a* defines an upper surface 156*a*, a ramp surface 158*a*, a locking surface 159*a* that extends to a terminating point 161*a*, a sliding surface 167*a*, a terminal surface 168*a*, and an inside surface 169*a* (FIG. 20). As will be described in more detail later, locking surfaces 159, 159*a* are adapted to comate with locking surfaces 56, 56*a* of guide apparatus 50 (FIG. 28). In addition, sliding surfaces 167, 167*a* (FIG. 19) are adapted to slide on ramp surfaces 58 and 58a of guide apparatus 50 (FIG. 4).

Referring to FIGS. 19 and 20, tape disc assembly 180 comprises a rotatable circular disc 182 with which is integrally molded a generally cylindrical tape retainer 184. Disc 182 also bears at its center an upstanding hollow hub 186 that fits over and revolves around axle 114. The periphery of disc 182 is roughened by providing teeth that are integrally molded with the disc. The area above the circular disc 182 generally defines a tape storage area on which a coil of endless tape 188 is wound. A loop of the tape 189 extends from the coil and over guide members 122, 121, 124, and 125, also around guides 118 and 119, in the manner shown in FIG. 20.

Referring to FIGS. 19–23, brake pressure-pad assembly 200 comprises a resilient sponge rubber pad 202 that is glued or otherwise affixed to top assembly 210 in the position shown in FIG. 21. The lower portion of the sponge rubber pad is provided with fibrous layer 204. The rubber pad 202 biases the inner edge 206 of layer 204 against disc 182 in the manner shown in FIG. 22. As a result, the fibrous layer provides a braking torque against the disc which prevents the tape loop from unravelling when the tape cartridge is withdrawn from player unit 30.

Referring to FIGS. 19, 21, and 24, top assembly 210 comprises an upper plate 212 that defines a rectangular orifice 214 by which pressure roller 36 enters the cartridge. Integrally molded with upper plate 212 is a rear wall 216, a left-hand wall 218, a right-hand wall 220, and a front wall 222 that has an upper edge 223. Front wall 222 defines a semicircular orifice 224 through which capstan 35 enters the cartridge. Integrally molded with front wall 222 (FIG. 24) are a left-hand lower plate 226 and a left hand side plate 228 that cover tape guide member 121. Likewise, integrally molded with front wall 222 are a right-hand lower plate 230 (FIG. 21) and a right-hand side plate 232 (FIG. 24) that cover tape guide member 122. After base assembly 102 and top assembly 210 are fit together as shown in FIGS. 24–26, they are held together by a screw 234 (FIG. 19) that fits through a hole 236 in upper plate 212. Alternatively, the base and top assemblies may be held together by press fits, sonic-welding, cement or other suitable means.

Figure 15:
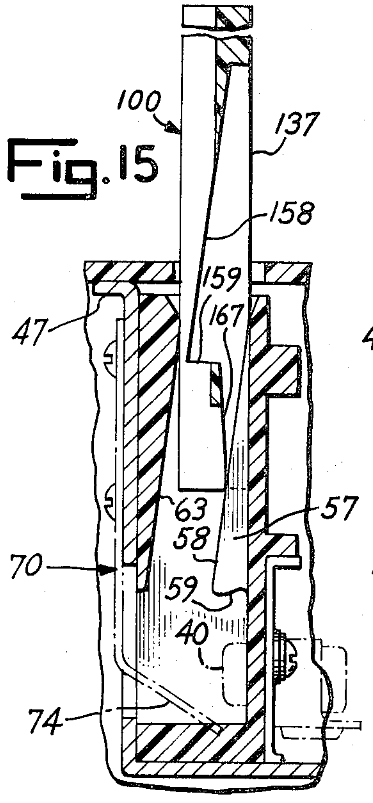
FIG. 15 is an enlarged, fragmentary, partially cross-sectional view of a cartridge and player guide apparatus made in accordance with the present invention in which the cartridge is only partially inserted in the player guide apparatus.
Figure 16:
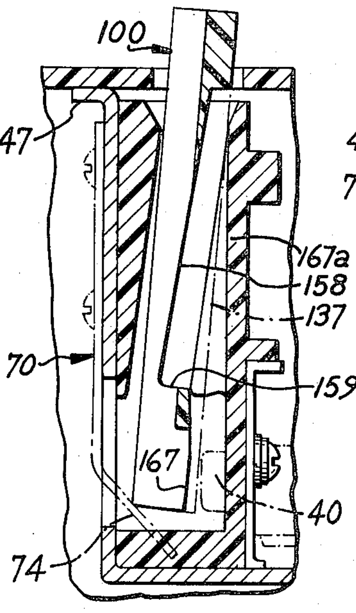
FIG. 16 shows the same apparatus as FIF. 15, except that the cartridge is nearly completely inserted in the player guide apparatus.
Figure 17:
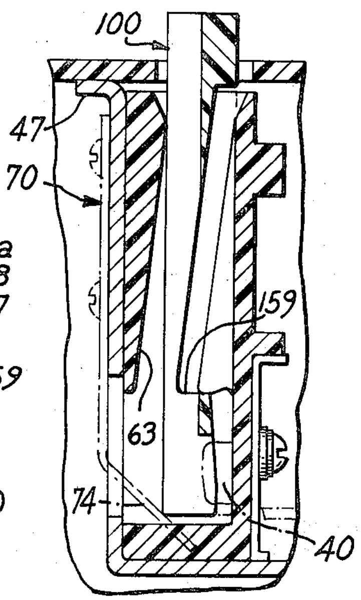
FIG. 17 shows the same apparatus shown in FIG. 15, except that the locking surfaces of the cartridge and player apparatus are engaged and the cartridge is completely inserted in the player guide apparatus.
Figure 18:
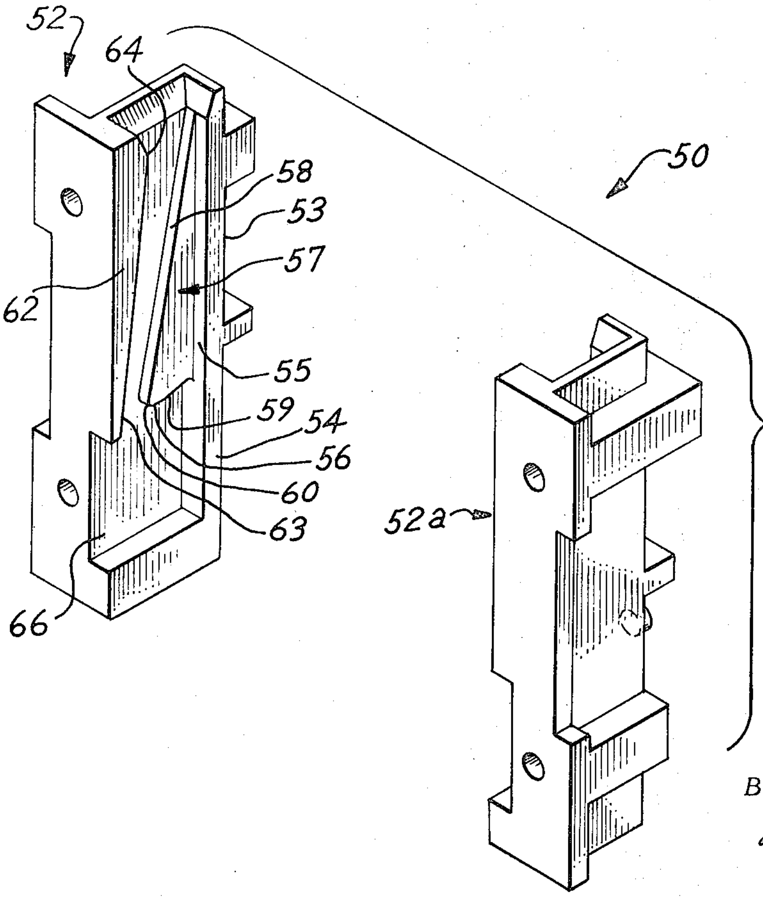
FIG. 18 is an enlarged, perspective view of a preferred form of player guiding and locking apparatus made in accordance with the present invention.

Referring to FIGS. 12–17, after cartridge 100 is assembled in the manner previously described, it is inserted into guide apparatus 50 as follows. As shown in FIG. 15, when the cartridge initially enters opening 43, supporting edges 137 and 143 (FIG. 6) rest against upper supporting surfaces 55 and 55*a* of guide apparatus 50. After the cartridge is inserted to the position shown in FIG. 15, sliding surfaces 167 and 167*a* begin to elevate the cartridge with respect to surfaces 55 and 55*a*. As shown in FIG. 14, as the cartridge is inserted, it is raised up and over head 40. After the cartridge is inserted at the position shown in FIG. 14, lip portion 74 of spring 70 begins to bear down on the cartridge with a force that tends to push it toward surfaces 55 and 55*a*, as well as upward toward opening 43. As a result, when terminating points 161, 161*a* of the cartridge are coincident with junctions 60, 60*a* of guide apparatus 50, the cartridge is forced foward and upward over head 40 by spring 70, in the manner shown in FIGS. 13 and 17. As a result, locking surfaces 56, 56*a* comate with locking surfaces 159, 159*a* in order to securely hold the cartridge in an exact, predetermined position with respect to head 40. As shown in FIG. 13, spring 70 continues to exert a force on the cartridge which holds it in a locked position with respect to a center line of head 40. As a result of the unique configuration of the apparatus, the center of tape loop 189 is exactly coincident with the center line 40*a* of tape head 40. As a result, the cartridge always tracks properly with respect to the head after it is inserted in the player unit. After the cartridge is fully inserted, surfaces 137, 143 again are supported by surfaces 55, 55*a* of guide apparatus 50. In addition, the cartridge is prevented from rocking or otherwise moving to the left as shown in FIG. 13 by restraining edges 64, 64*a*.

As the cartridge is lowered into the position shown in FIG. 13, head 40 moves sponge rubber pad 202 and fibrous layer 204 to the left so that inner edge 205 is moved away from disc 182. In this manner, the disc is free to rotate around bearing 112 when driven cooperatively by the capstan and pressure roller.

In order to remove the cartridge from guide apparatus 50, the operator's thumb or forefinger is moved into opening 45*a*, and the cartridge is moved to the left as shown in FIG. 14. Spring 70 is then 0compressed, and after the cartridge has cleared the head, the spring helps propel the cartridge upward through opening 43. The cartridge may then be easily withdrawn by the operator by the reverse of the insertion process described above.

Those skilled in the art will recognize that the embodiment shown herein is merely exemplary of the preferred practice of the invention, and that various modifications may be made therein without departing from the true spirit and scope of the invention as defined in the appended claims.

What is claimed is:

1. In a tape cartridge for an endless sound reproducing tape comprising a base defining a first side edge, a second side edge opposite the first side edge, a rear edge, and a front edge opposite the rear edge, a tape disc assembly mounted on the base for rotation, said tape disc assembly defining a tape storage area for receiving a coil of sound reproducing tape, a top for covering the tape storage area, tape guide means positioned adjacent the front edge of the cartridge for guiding a loop of such tape from the tape disc assembly across the front of the cartridge, at least one head opening defined in the front of the cartridge adapted to receive a head of a sound reproducing apparatus, and a pressure pad located in the cartridge adjacent the head opening so that the tape is biased against the head, improved apparatus for guiding and releasably locking the cartridge in relationship to the head comprising:

first means located adjacent the first side edge of the cartridge between the top and the base for defining a first planar locking surface substantially perpendicular to the base that extends from a first origin point adjacent the top toward the base of the cartridge to a first termination point;

second means for defining a first sliding surface that extends from the first termination point toward the front edge of the cartridge;

third means located adjacent the second side edge of the cartridge between the top and the base for defining a second planar locking surface that extends from a second origin point adjacent the top toward the base of the cartridge parallel to the first locking surface to a second termination point, whereby the head opening may be accurately aligned with the head;

fourth means for defining a second sliding surface that extends from the second termination point toward the front edge of the cartridge parallel to the first sliding surface;

a first planar ramp surface adjacent the first side edge of the cartridge defining a plane making an acute angle with the base, said first planar ramp surface extending from the first origin point toward the rear of the tape cartridge; and a second planar ramp surface adjacent the second side edge of the cartridge and lying in said plane, said second planar ramp surface extending from the second origin point toward the rear of the tape cartridge.

2. In a tape system including a tape cartridge for an endless sound reproducing tape comprising a base defining a first side edge, a second side edge, and a front edge, a tape disc assembly mounted on the base for rotation, said tape disc assembly defining a tape storage area for receiving a coil of sound reproducing tape, a top for covering the tape storage area, tape guide means positioned adjacent the front edge of the cartridge for guiding a loop of such tape from the tape disc assembly across the front of the cartridge, at least one head opening defined in the front of the cartridge, a pressure pad located in the cartridge adjacent the head opening so that the tape is biased against the head, and a cartridge player comprising a head adapted to fit through the head opening, improved apparatus located on the cartridge and the player for guiding and releasably locking the cartridge in relationship to the head comprising:

first means located on the cartridge adjacent the first side edge of the cartridge between the top and the base for defining a first locking surface that extends from the top toward the base of the cartridge to a first termination point;

second means on the cartridge for defining a first sliding surface that extends from the first termination point toward the front edge of the cartridge;

third means located on the cartridge adjacent the second side edge of the cartridge between the top and the base for defining a second locking surface that extends from the top toward the base of the cartridge parallel to the first locking surface to a second termination point, whereby the head opening may be accurately aligned with the head;

fourth means on the cartridge for defining a second sliding surface that extends from the second termination point toward the front edge of the cartridge parallel to the first sliding surface;

fifth means on the player for defining a first ramp surface for carrying the first sliding surface;

sixth means on the player for defining a second ramp surface for carrying the second sliding surface, so that the head opening is moved over the head;

seventh means on the player for defining a third locking surface extending from the first ramp surface for comating with the first locking surface;

eighth means on the player for defining a fourth locking surface extending from the second ramp surface for comating with the second locking surface, said third and fourth locking surfaces being parallel;

ninth means on the player for defining a supporting surface substantially perpendicular to the third and fourth locking surfaces for supporting the base of the tape cartridge;

tenth means on the player for positioning the center of the head a predetermined distance from the third and fourth locking surfaces; and biasing means on the player for biasing the tape cartridge toward the first and second ramp surfaces and toward the open end, whereby the head opening is moved toward the head as the locking surfaces are moved adjacent each other so that the cartridge is held in position by the locking surfaces.

3. Apparatus, as claimed in claim 2, and further comprising:

eleventh means on the player for defining a third ramp surface opposite the first ramp surface, said third ramp surface having a first restraining edge located adjacent the open end; and twelfth means on the player for defining a fourth ramp surface opposite the second ramp surface, said fourth ramp surface having a second restraining edge located adjacent the open end and colinear with the first restraining edge.

4. Apparatus, as claimed in claim 2, and further comprising eleventh means for defining a third ramp surface opposite a plane joining the first and second ramp surfaces, said third ramp surface having a first restraining edge located adjacent the open end.

* * * * *